(12) United States Patent
Naitoh

(10) Patent No.: US 7,444,061 B2
(45) Date of Patent: Oct. 28, 2008

(54) VIDEO RECORD APPARATUS

(75) Inventor: Tadahiro Naitoh, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 742 days.

(21) Appl. No.: 11/116,834

(22) Filed: Apr. 28, 2005

(65) Prior Publication Data

US 2005/0259975 A1    Nov. 24, 2005

(30) Foreign Application Priority Data

Apr. 28, 2004    (JP)    ............... 2004-132717

(51) Int. Cl.
*H04N 5/00*    (2006.01)
*H04N 7/00*    (2006.01)

(52) U.S. Cl. ........................ 386/46; 386/125
(58) Field of Classification Search .............. 386/46, 386/125, 124, 45, 92, 107, 117
See application file for complete search history.

(56) References Cited

U.S. PATENT DOCUMENTS

| | | | | |
|---|---|---|---|---|
| 5,331,474 | A * | 7/1994 | Lee ............................. | 360/13 |
| 6,088,315 | A * | 7/2000 | Ando ........................ | 369/47.41 |
| 2003/0086350 | A1* | 5/2003 | Kurashina et al. ........ | 369/59.25 |
| 2004/0246823 | A1* | 12/2004 | Kwon ...................... | 369/24.01 |
| 2006/0184497 | A1* | 8/2006 | Suzuki et al. .................. | 707/1 |

FOREIGN PATENT DOCUMENTS

| | | |
|---|---|---|
| JP | 2-101399 | 4/1990 |
| JP | 10-150609 | 6/1998 |
| JP | 11-88819 | 3/1999 |

OTHER PUBLICATIONS

Patent Abstracts of Japan, Publication No. 10-150609, Publication Date Jun. 2, 1998, 1 page.
Patent Abstracts of Japan, Publication No. 02-101399, Publication Date Apr. 13, 1990, 1 page.
Patent Abstracts of Japan, Publication No. 11-088819, Publication Date Mar. 30, 1999, 1 page.

* cited by examiner

*Primary Examiner*—Robert Chevalier
(74) *Attorney, Agent, or Firm*—Osha Liang LLP

(57) ABSTRACT

When a video is input from a DV camcorder connected through an IEEE 1394 interface, a DVD recorder displays the input video in a dubbing screen displayed on a monitor of a television and starts dubbing the input video on a DVD. Subsequently, the DVD recorder displays a DV scene cut key for entering a temporary stop command of dubbing the input video on the monitor together with the input video. When the user operates the DV scene cut key with a remote controller, the DVD recorder temporarily stops dubbing the input video on the DVD. Accordingly, it is made possible to dub in a short time while the user reliably cuts the unnecessary scene of the input video being dubbed by properly operating the DV scene cut key just after display of the unnecessary scene is started on the monitor.

8 Claims, 7 Drawing Sheets

VIDEO RECORD APPARATUS

BACKGROUND OF THE INVENTION

1. Field of the Invention

This invention relates to a video record apparatus which is connected to a video playback apparatus and can dub video played back by the video playback apparatus.

2. Description of the Related Art

Some video record apparatus that can record a video, such as a DVD recorder and an HDD recorder, can dub (record) a video photographed with a DV camcorder (digital video camcorder, also called digital video camera), etc. A general dubbing method in a related art is as follows: For example, the user connects a DVD recorder and a DV camcorder by a cable and then presses a playback key provided on the DV camcorder, whereby the video previously photographed with the DV camcorder and recorded on DV tape is played back and is input to the DVD recorder and in this state, the user presses a record key provided on the DVD recorder, whereby the video input from the DV camcorder is recorded on a DVD (digital versatile disk) placed in the DVD recorder. At this time, the video to be dubbed is displayed on a monitor of a television, thus enabling the user to dub the video while checking it, as described in JP-A-10-150609 listed below.

To cut (not to dub) an unnecessary scene of the video of the DV camcorder, when the unnecessary scene is played back in the DV camcorder and display of the unnecessary scene is started on the monitor of the television, etc., the user presses a temporary stop key provided on the DVD recorder for temporarily stopping record of the input video from the DV camcorder on the DVD and then when playing back the unnecessary scene in the DV camcorder terminates and subsequently a necessary scene is played back and display of the necessary scene is started on the monitor of the television, etc., the user presses the record key of the DVD recorder for restarting record of the input video on the DVD. When the user presses the temporary stop key for temporarily stopping record of the video, a mark indicating the record temporary stop state is displayed on the monitor of the television, whereby it is made possible for the user to keep track of the state and remember to again operate the record key, as described in JP-A-2-101399 listed below.

Another dubbing method described in JP-A-11-88819 listed below is as follows: In edit playback processing, whenever a record video on cassette tape is played back for predetermined seconds in a video camera, the user presses a selection key or a non-selection key provided on the video camera for selecting dubbing or no dubbing of the video in the playback area for the predetermined seconds and records the selection result in memory of the video camera. Then, in record processing, if the user presses an edit playback start key provided on the video camera, the video camera determines whether the area to be played back is a dubbing area or a dubbing skip area based on the selection result in the memory. If the area is a dubbing area, the video camera plays back the area for input to a video deck and also transmits a record signal to the video deck for recording the input video on video tape; if the area is a dubbing skip area, the video camera transmits a temporary stop signal to the video deck for temporarily stopping record of the input video and fast-forwards without playing back the dubbing skip area.

As described above, in the related art, to cut an unnecessary scene of the video input from the DVD camcorder, the user must press the temporary stop key provided on the DVD recorder just after the unnecessary scene is played back in the DV camcorder and display of the unnecessary scene is started on the monitor of the television. However, the DVD recorder generally is provided with a large number of keys such as the record key and the stop key in addition to the temporary stop key and thus if the user attempts to press the temporary stop key promptly, he or she may press a different key by mistake; in the related art, an unnecessary scene cannot reliably be cut; this is a problem. In contrast, in JP-A-11-88819, if the necessary scene of the record video on cassette tape is set as a dubbing area and the unnecessary scene is set as a dubbing skip area in the edit playback processing, the user simply presses the edit playback start key in the later record processing, whereby the unnecessary scene is cut and only the necessary scene is dubbed in the video deck, so that the problem of not cutting the unnecessary scene because of erroneous key operation as in the related art does not occur. However, in JP-A-11-88819, the record video on cassette tape must be played back in the video camera at the edit playback processing time and at the record processing time and therefore it takes a long time until the video is dubbed; this is a problem.

SUMMARY OF THE INVENTION

It is therefore an object of the invention to provide a video record apparatus capable of dubbing a video of a video playback apparatus in a short time while reliably cutting an unnecessary scene.

According to the invention, there is provided a video record apparatus including a communication unit for communicating with a video playback apparatus connected to the video record apparatus, an operation unit operated by a user to enter an operation command, and a control unit for displaying a video played back in the video playback apparatus and input through the communication unit on a display unit connected to the video record apparatus and recording the video on a record medium based on user's operation of the operation unit, wherein when starting to record the input video from the video playback apparatus on the record medium, the control unit displays a record cut key for entering a temporary stop command of recording the input video on the display unit and when the user operates the record cut key through the operation unit, the control unit temporarily stops recording the input video on the record medium.

As described above, when dubbing (recording) of the input video from the video playback apparatus on the record medium is started, the record cut key is displayed on the display unit, whereby the user can check the input video being dubbed and the record cut key at the same time by seeing the display unit, so that it is made possible for the user to reliably cut the unnecessary scene of the video (skip recording the unnecessary scene on the record medium) by properly operating the record cut key just after display of the unnecessary scene is started on the display unit. While dubbing the input video from the video playback apparatus on the record medium, the user can cut the unnecessary scene of the video, so that it is made possible for the user to dub in a short time.

In the invention, when the user operates the record cut key through the operation unit, the control unit displays a record restart key for entering a record restart command of the input video from the video playback apparatus on the display unit in place of the record cut key and when the user operates the record restart key through the operation unit, the control unit restarts recording the input video on the record medium and displays the record cut key on the display unit in place of the record restart key. Thus, when the record cut key is operated, the record restart key is displayed on the display unit in place of the record cut key, whereby the user can check the input video whose dubbing is cut and the record restart key at the same time by seeing the display unit, so that the user can properly operate the record restart key just after the unnecessary scene of the video passes and display of a necessary scene is started on the display unit, and it is made possible for the user to reliably terminate cutting the unnecessary scene and reliably restart dubbing the necessary scene. The record cut key and the record restart key are switched on the display of the display unit as described above, whereby the record cut key is displayed on the display unit while the input video is being dubbed and the record restart key is displayed on the display unit during temporary stop of dubbing, so that it is made possible for the user to reliably operate the record cut key or the record restart key without performing erroneous operation when necessary.

In the invention, the control unit displays a record start key for entering a record start command of the video of the video playback apparatus on the display unit and when the user operates the record start key through the operation unit, the control unit transmits a control signal through the communication unit to the video playback apparatus for causing the video playback apparatus to start playing back the video, starts recording the video played back and input from the video playback apparatus on the record medium, and displays the record cut key on the display unit in place of the record start key. Thus, the record start key is displayed on the display unit, whereby the user can check the record start key by seeing the display unit and it is made possible for the user to properly operate the record start key for starting playback of the video in the video playback apparatus and dubbing of the video at the same time. The user needs only to operate the record start key without operating any operation key provided on the video playback apparatus, so that the key operation to start dubbing can be facilitated.

In the invention, when starting to record the input video from the video playback apparatus on the record medium, the control unit displays a record quit key for entering a record quit command of recording the input video and when the user operates the record quit key through the operation unit, the control unit quits recording the input video on the record medium and transmits a control signal through the communication unit to the video playback apparatus for causing the video playback apparatus to quit playing back the video. Thus, when dubbing of the input video from the video playback apparatus on the record medium is started, the record quit key is displayed on the display unit, whereby the user can check the input video being dubbed and the record quit key at the same time by seeing the display unit, so that it is made possible for the user to properly operate the record quit key in any desired scene for quitting dubbing of the video and playback of the video in the video playback apparatus at the same time. The user needs only to operate the record quit key without operating any operation key provided on the video playback apparatus, so that the key operation to quit dubbing and playback of the video to be dubbed can be facilitated.

In the invention, the control unit displays the operation state of the video record apparatus and the video playback apparatus on the display unit. In doing so, the user can keep track of the operation state of the video record apparatus and the video playback apparatus by seeing the display unit, so that it is made possible to reliably prevent erroneous operation of each key displayed on the display unit.

In the invention, the video record apparatus further includes an erasion setting unit for setting the time for retroactively erasing the video recorded on the record medium before the operation time of the record cut key, wherein when the user operates the record restart key after operating the record cut key through the operation unit, the control unit overwrites the video recorded on the record medium before the time set with the erasion setting unit from the operation time of the record cut key with the input video from the video playback apparatus. In doing so, it is made possible to reliably cut the unnecessary scene before the actual operation time of the record cut key since starting of display of the unnecessary scene of the input video from the video playback apparatus on the display unit.

In the invention, the video record apparatus further includes a record setting unit for setting the time for retroactively recording the video input from the video playback apparatus before the operation time of the record restart key, wherein when the user operates the record restart key through the operation unit, the control unit records the input video from the video playback apparatus before the time set with the record setting unit from the operation time of the record restart key. In doing so, it is also made possible to reliably dub the necessary scene before the actual operation time of the record restart key since starting of display of the necessary scene after passage of the unnecessary scene of the input video from the video playback apparatus.

Further, in the invention, the communication unit is an IEEE 1394 interface conforming to the IEEE 1394 standard, the operation unit is a remote controller, the display unit is a monitor of a television connected to the video record apparatus, and the control unit is a control section made up of a CPU, memory of RAM and ROM, etc. In this configuration, the control section first displays the operation state of the video record apparatus and the video playback apparatus and the record start key on the monitor. When the user operates the record start key with the remote controller, the control section transmits a control signal through the interface to the video playback apparatus for causing the video playback apparatus to start playing back the video, starts recording the video played back and input from the video playback apparatus on the record medium, and displays the record cut key and the record quit key in place of the record start key. Then, when the user operates the record cut key with the remote controller, the control section temporarily stops recording the input video on the record medium and displays the record restart key on the monitor together with the record quit key in place of the record cut key. When the user operates the record restart key with the remote controller, the control section restarts recording the input video on the record medium and again displays the record cut key on the monitor in place of the record restart key. When the user operates the record quit key with the remote controller, the control section quits recording the input video on the record medium, transmits a control signal through the interface to the video playback apparatus for causing the video playback apparatus to quit playing back the video, and again displays the record start key on the monitor in place of the record quit key and the record cut key or the record restart key. The keys are switched on the display of the display unit as described above, whereby the user can check the record start key when input video from the video playback apparatus does not exist and the record quit key and the record cut key or the record restart key when input video exists by seeing the monitor as required, so that the user can properly operate any necessary key when necessary and it is made possible to reliably prevent erroneous operation of the keys.

According to the invention, the user can check the input video being dubbed and the record cut key at the same time by seeing the display unit, so that it is made possible for the user to reliably cut the unnecessary scene of the video by properly operating the record cut key just after display of the unnecessary scene is started on the display unit. While dubbing the input video from the video playback apparatus on the record medium, the user can cut the unnecessary scene of the video, so that it is made possible for the user to dub in a short time.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
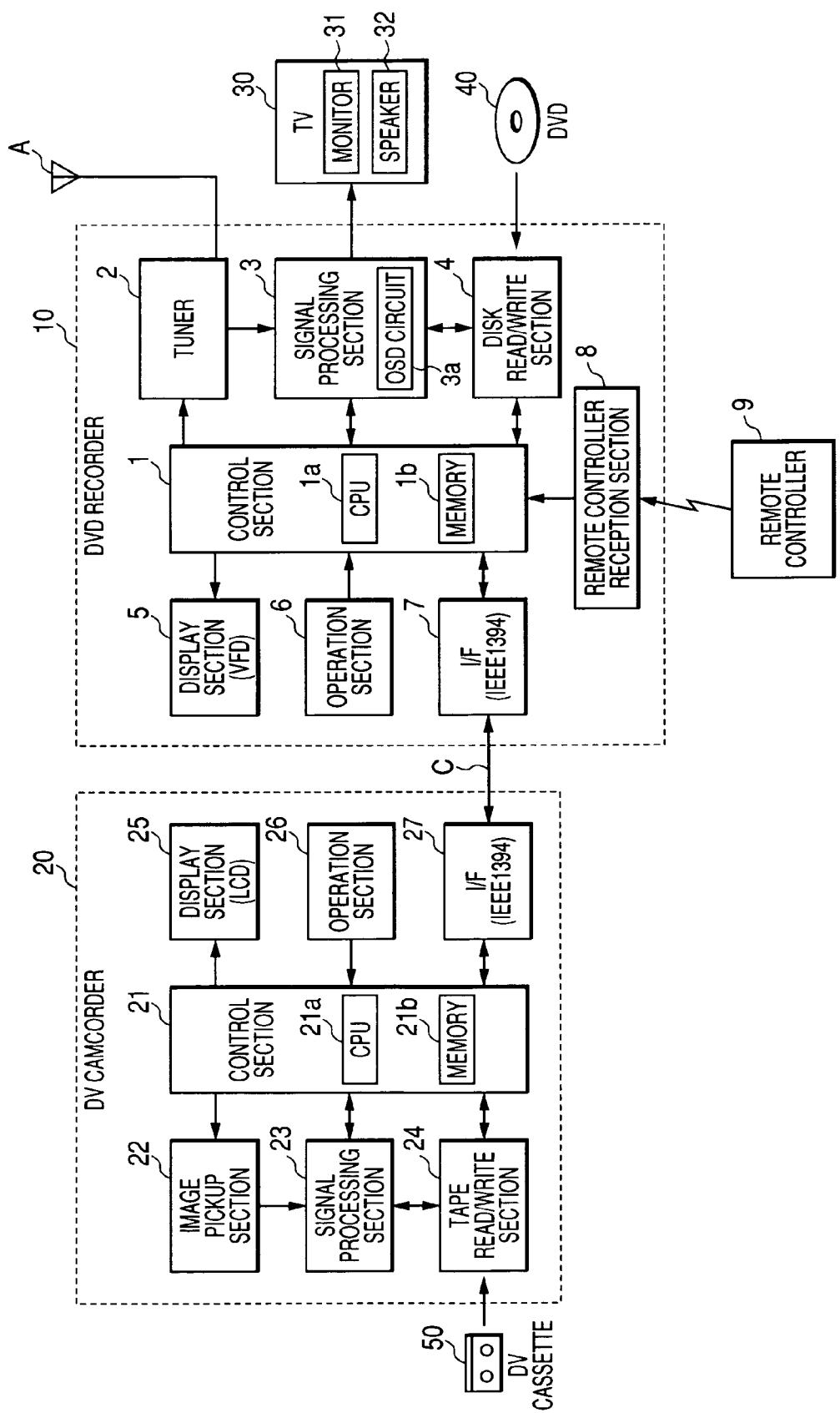
FIG. 1 is a block diagram to show a DVD recorder and a DV camcorder.

FIG. 1 is a block diagram to show a DVD recorder and a DV camcorder. In FIG. 1, a DVD (digital versatile disk) recorder 10 shown at the right forms one embodiment of a video record apparatus in the invention and a DV (digital video) camcorder 20 shown at the left forms one embodiment of a video playback apparatus in the invention. The DVD recorder 10 and the DV camcorder 20 include IEEE 1394 interfaces (simply, interfaces) 7 and 27 conforming to the IEEE 1394 standard for connecting AV machines or an AV machine and a personal computer and are connected by a cable C conforming to the standard. Thus, the DVD recorder 10 and the DV camcorder 20 can recognize each other through the interfaces 7 and 27 and can communicate with each other. The interface 7 forms one embodiment of a communication unit in the invention. Numeral 30 denotes a television set (simply, TV) and the TV 30 is connected to the DVD recorder 10.

In the DVD recorder 10, numeral 1 denotes a control section for controlling the sections of the DVD recorder 10 and the control section 1 is made up of a CPU 1a, memory 1b such as RAM and ROM, and the like. The control section 1 forms one embodiment of a control unit in the invention. A denotes an antenna for receiving airwaves of a TV program, etc., and numeral 2 denotes a tuner for performing channel selection of the airwaves (analog signals containing video) received at the antenna A. Numeral 3 denotes a signal processing section and the signal processing section 3 outputs the analog signal input from the tuner 2 to the TV 30 and digitizes the analog signal and then converts the digitized data into compressed data in an MPEG2 (Moving Picture Experts Group Phase 2) format (MPEG coding) for output to a disk read/write section 4. The signal processing section 3 converts data input from the DV camcorder 20 into an analog signal for output to the TV 30 and converts data input from the DV camcorder 20 into data in the MPEG2 format for output to the disk read/write section 4, as described later. The disk read/write section 4 is made up of a pickup, a pickup drive circuit, a disk drive circuit, etc., for recording data input from the control section 1 and the signal processing section 3 on a DVD 40 placed in the DVD recorder 10 and reading data recorded on the DVD 40 and outputting the read data to the control section 1 and the signal processing section 3. The data output from the disk read/write section 4 to the signal processing section 3 is played back (is subjected to MPEG decoding and conversion to analog signal) in the signal processing section 3 for output to the TV 30. The TV 30 displays video on a monitor 31 and outputs voice from a speaker 32 based on the analog signal provided by the signal processing section 3. The monitor 31 of the TV 30 forms one embodiment of a display unit in the invention. An OSD (on screen display) circuit 3a of the signal processing section 3 processes the image data input from the control section 1 so that the image data can be on-screen displayed on the monitor 31 of the TV 30.

Figure 2:
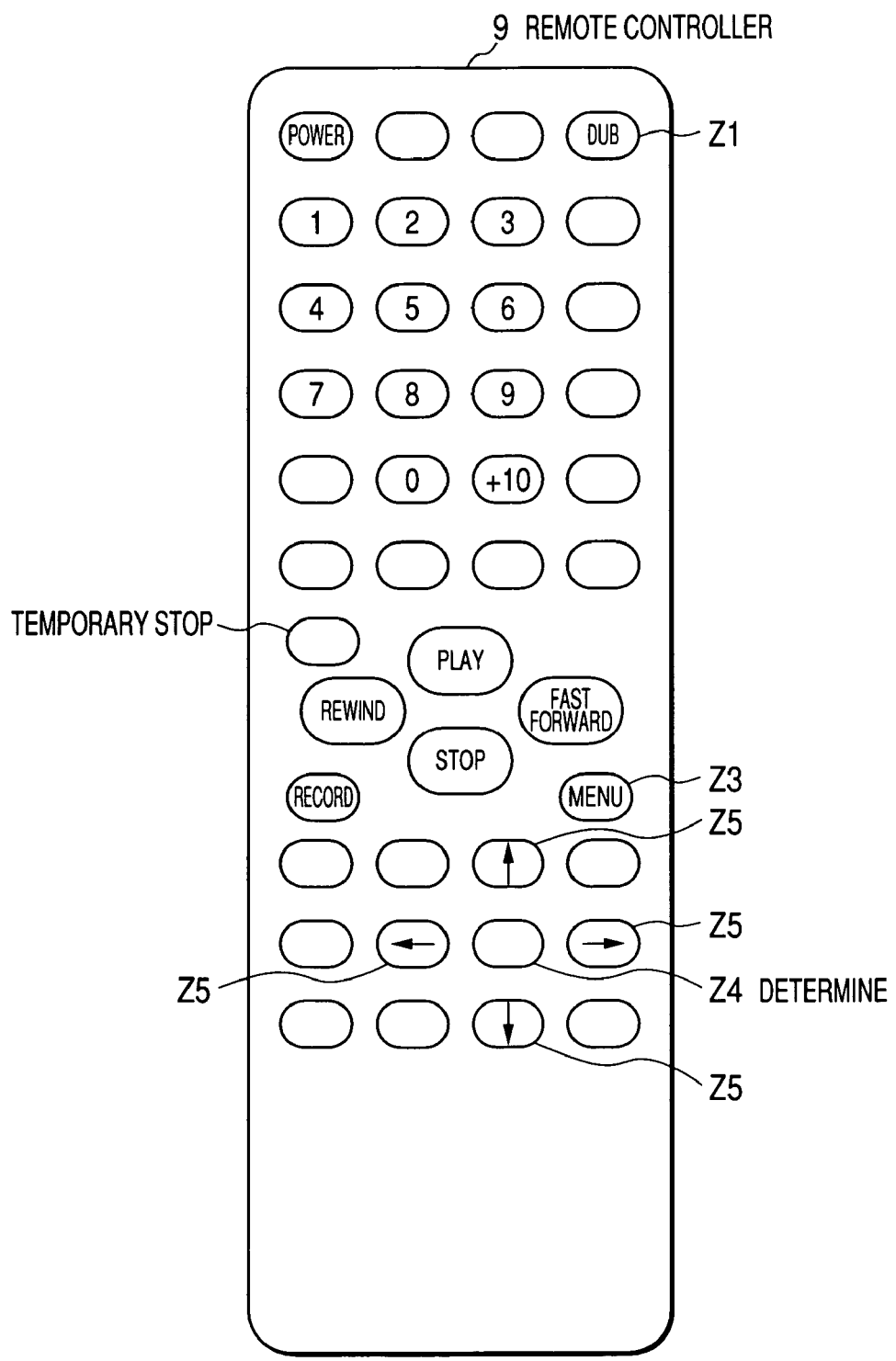
FIG. 2 is a drawing to show a remote controller of the DVD recorder.

Numeral 5 denotes a display section implemented as a VFD (vacuum fluorescent display) for displaying the time, the operation state of the DVD recorder 10, and the like. Numeral 6 denotes an operation section made up of various operation keys provided on the main unit section of the DVD recorder 10. Numeral 8 denotes a remote controller reception section for receiving a signal from a remote controller 9. The remote controller 9 forms one embodiment of an operation unit in the invention and includes various operation keys as shown in FIG. 2. Important keys in the embodiment are a dub key Z1, a menu key Z3, a determine key Z4, and an arrow key Z5.

In the DV camcorder 20 in FIG. 1, numeral 21 denotes a control section for controlling the sections of the DV camcorder 20 and the control section 21 is made up of a CPU 21a, memory 21b such as RAM or ROM, and the like. Numeral 22 denotes an image pickup section implemented as a camera for photographing video. Numeral 23 denotes a signal processing section and the signal processing section 23 digitizes the video photographed in the image pickup section 22 and then converts the digitalized video into data compressed in a DV (digital video) format for output to a tape read/write section 24. The tape read/write section 24 writes the input data from the signal processing section 23 onto tape of a DV cassette 50 placed in the DV camcorder 20 and reads record data on tape and outputs the read data to the signal processing section 23. The data sent from the tape read/write section 24 to the signal processing section 23 is played back in the signal processing section 23. Numeral 25 denotes a display section implemented as an LCD (liquid crystal display) for displaying the video photographed in the image pickup section 22 and the video played back in the signal processing section 23. Numeral 26 denotes an operation section made up of operation keys provided on the DV camcorder 20. The user can operate the operation section 26 for adding information of a title, etc., to the video photographed in the image pickup section 22 and to be recorded or recorded on the DV cassette 50. The control section 21 sends the video played back in the signal processing section 23 to the DVD recorder 10 through the interface 27.

Figure 3:
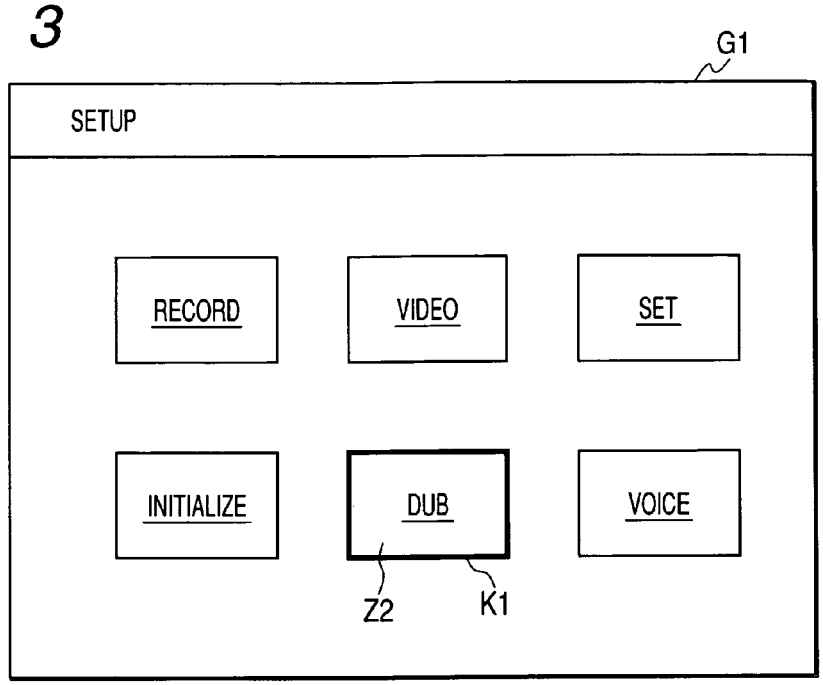
FIG. 3 is a drawing to show an example of a screen displayed on a monitor of a TV.
Figure 4A:
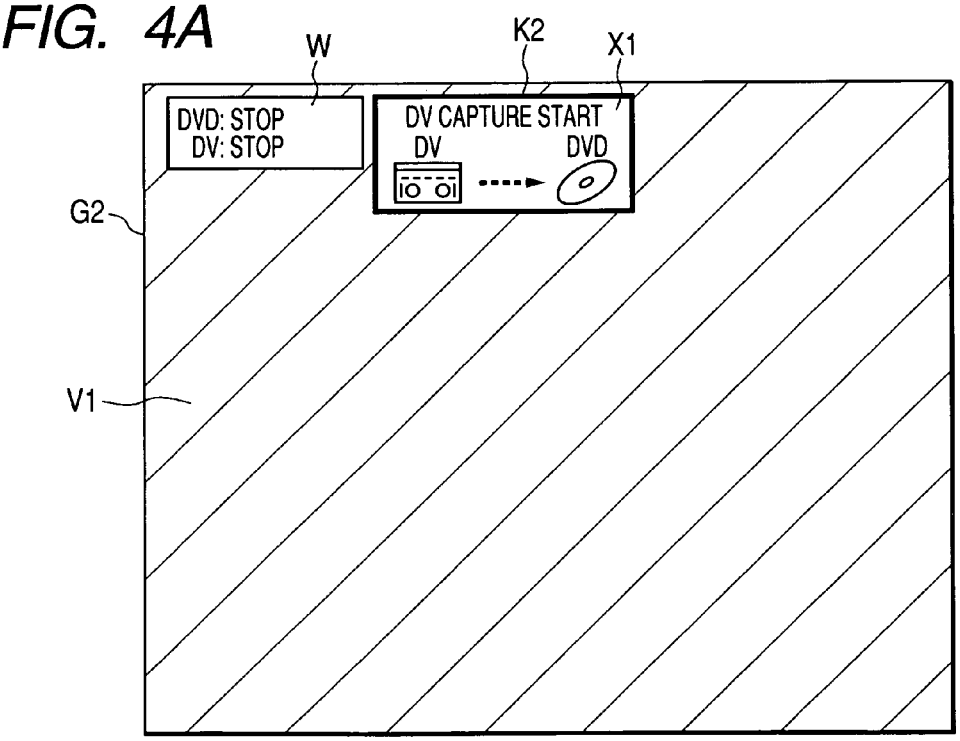
FIG. 4A is a drawing to show an example of a screen displayed on the monitor of the TV.

FIGS. 3 and 4A to 4C are drawings to show examples of screens on-screen displayed on the monitor 31 of the TV 30 (FIG. 1). The image data of each screen is recorded in the memory 1b of the control section 1 of the DVD recorder 10. A setup screen G1 shown in FIG. 3 is displayed on the monitor 31 when the user presses the menu key Z3 of the remote controller 9 (FIG. 2). Six keys of record, video, set, initialize, dub, and voice are provided in the screen G1. If the user operates the arrow key Z5 (FIG. 2) for moving a cursor K1 in the screen G1 over the dub key Z2 and presses the determine key Z4 (FIG. 2), the state in which the dub key Z2 is pressed (ON state) is entered and then the screen G1 disappears from the monitor 31 and instead a dubbing screen G2 shown in FIG. 4A is displayed on the monitor 31. The dubbing screen G2 is also displayed when the user presses the dub key Z1 of the remote controller 9 (FIG. 2).

Figure 4B:
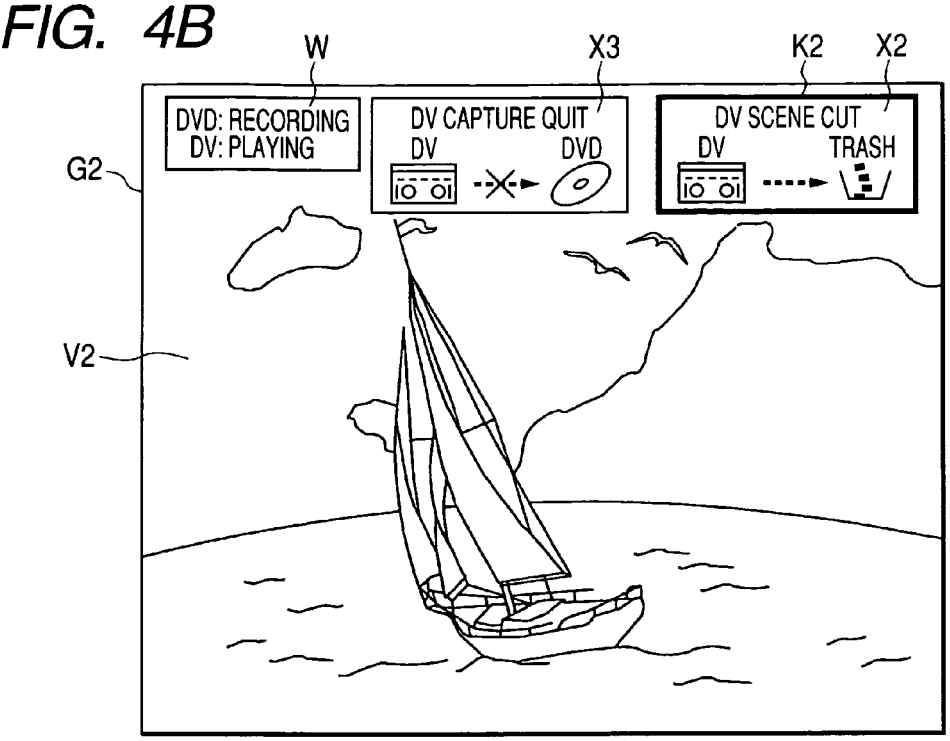
FIG. 4B is a drawing to show an example of a screen displayed on the monitor of the TV.
Figure 4C:
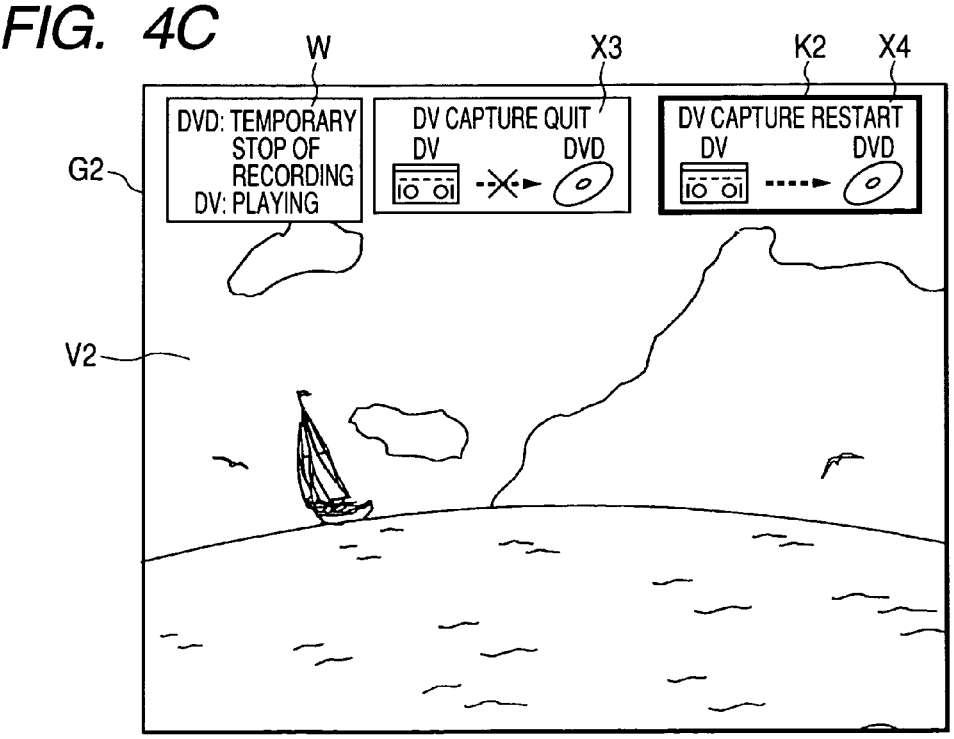
FIG. 4C is a drawing to show an example of a screen displayed on the monitor of the TV.

In the dubbing screen G2, a blue back video (blue background video) V1 is displayed as shown in FIG. 4A before record video of the DV cassette 50 is played back in the DV camcorder 20 and is input to the DVD recorder 10 through the interface 27. When the video is input from the DV camcorder 20 to the DVD recorder 10, an input video V2 from the DV camcorder 20 is displayed as shown in FIGS. 4B and 4C in place of the blue back video V1. W denotes a state window for indicating the operation state of the DVD recorder 10 and the DV camcorder 20. The window W in FIG. 4A indicates that both the DVD recorder 10 and the DV camcorder 20 stop. The window W in FIG. 4B indicates that the DV camcorder 20 is playing back the record video of the DV cassette 50 and the DVD recorder 10 is recording the video played back in the DV camcorder 20 and input through the interface 7 on the DVD 40. Further, the window W in FIG. 4C indicates that the DV camcorder 20 is playing back the video recorded on the DV cassette 50 and the DVD recorder 10 temporarily stops recording the video input from the DV camcorder 20 on the DVD 40.

A DV capture start key X1 shown in FIG. 4A is a key for entering a record start command of video of the DV camcorder 20 and forms one embodiment o a record start key in the invention. If the user presses the determine key Z4 of the remote controller 9 with a cursor K2 moved over the start key X1 (state in FIG. 4A), the state in which the start key X1 is pressed (ON state) is entered and then the DV camcorder 20 starts playing back the record video of the DV cassette 50 and the DVD recorder 10 starts recording the video played back and input from the DV camcorder 20 on the DVD 40. The display of the start key X1 disappears from the screen G2 and instead a DV scene cut key X2 and a DV capture quit key X3 are displayed as shown in FIG. 4B. The DV scene cut key X2 is a key for entering a temporary stop command of record of the input video from the DV camcorder 20 and forms one embodiment of a record cut key in the invention. The DV capture quit key X3 is a key for entering a record quit command of the input video and forms one embodiment of a record quit key in the invention. When the scene cut key X2 and the quit key X3 are displayed on the screen G2, the state in which the cursor K2 is moved over the scene cut key X2 promptly operated and often used is entered.

If the user presses the determine key Z4 with the cursor K2 moved over the scene cut key X2 (state in FIG. 4B), the state in which the scene cut key X2 is pressed (ON state) is entered and then the DVD recorder 10 temporarily stops recording the input video from the DV camcorder 20 on the DVD 40 as described later. The display of the scene cut key X2 disappears from the screen G2 and instead a DV capture restart key X4 is displayed together with the quit key X3 as shown in FIG. 4C. The DV capture restart key X4 is a key for entering a record restart command of the input video from the DV camcorder 20 and forms one embodiment of a record restart key in the invention. When the restart key X4 and the quit key X3 are displayed on the screen G2, the state in which the cursor K2 is moved over the restart key X4 promptly operated and often used is entered.

If the user presses the determine key Z4 with the cursor K2 moved over the restart key X4 (state in FIG. 4C), the state in which the restart key X4 is pressed (ON state) is entered and then the DVD recorder 10 restarts recording the input video from the DV camcorder 20 on the DVD 40 as described later. The display of the restart key X4 disappears from the screen G2 and instead the scene cut key X2 is displayed together with the quit key X3 as shown in FIG. 4B. If the user operates the arrow key Z5 of the remote controller 9 (once presses the arrow key Z5 facing leftward) for moving the cursor K2 over the quit key X3 and presses the determine key Z4 in this state, the state in which the quit key X3 is pressed (ON state) is entered and then the DVD recorder 10 quits recording the input video from the DV camcorder 20 on the DVD 40 and the DV camcorder 20 quits playing back the record video of the DV cassette 50 as described later. The display of the quit key X3 and the scene cut key X2 or the restart key X4 disappears from the screen G2 and instead the start key X1 is displayed together with the blue back video V1 as shown in FIG. 4A.

Figure 5:
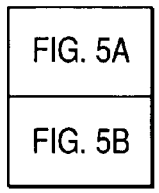
FIG. 5, broken into
Figure 5A:
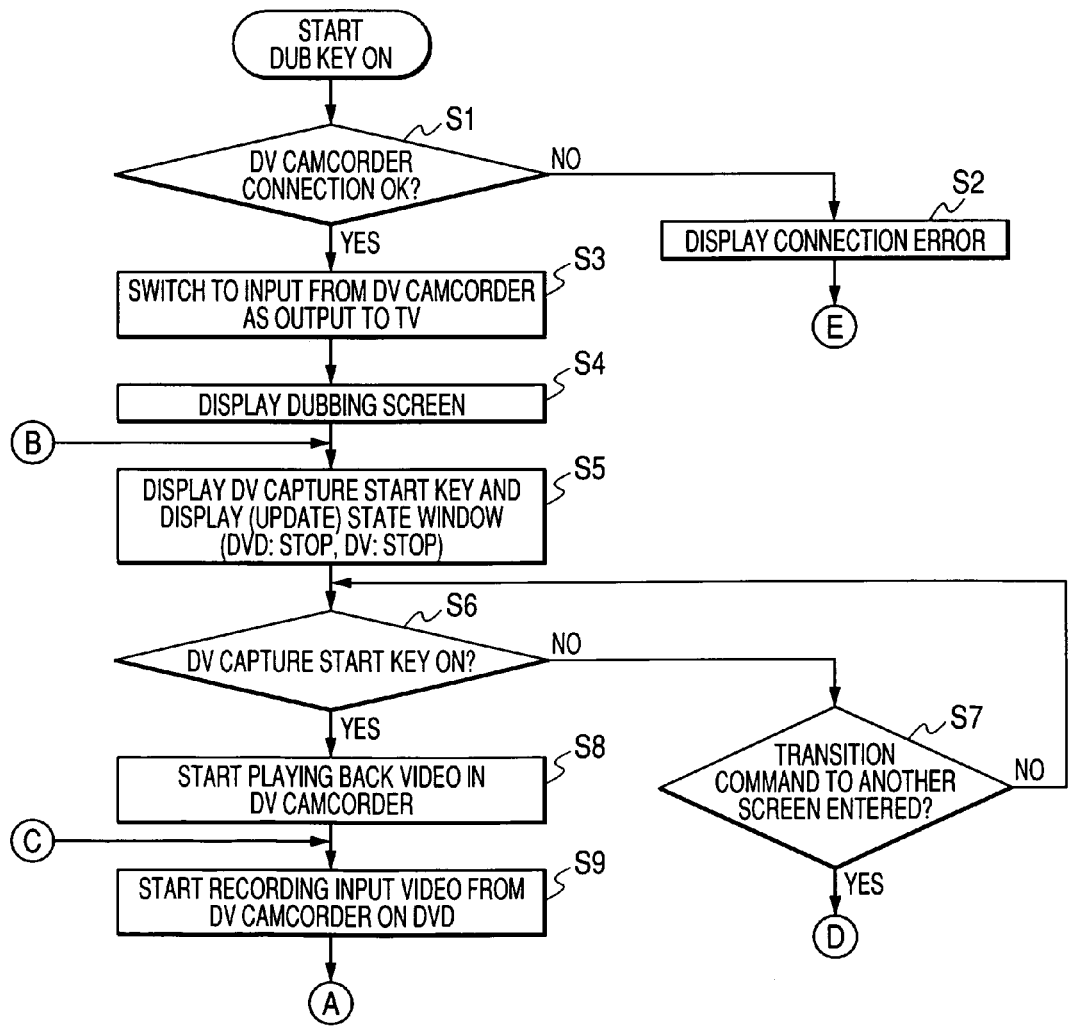
FIG. 5A and FIG. 5B, is a flowchart to show an operation procedure of the DVD recorder.
Figure 5B:
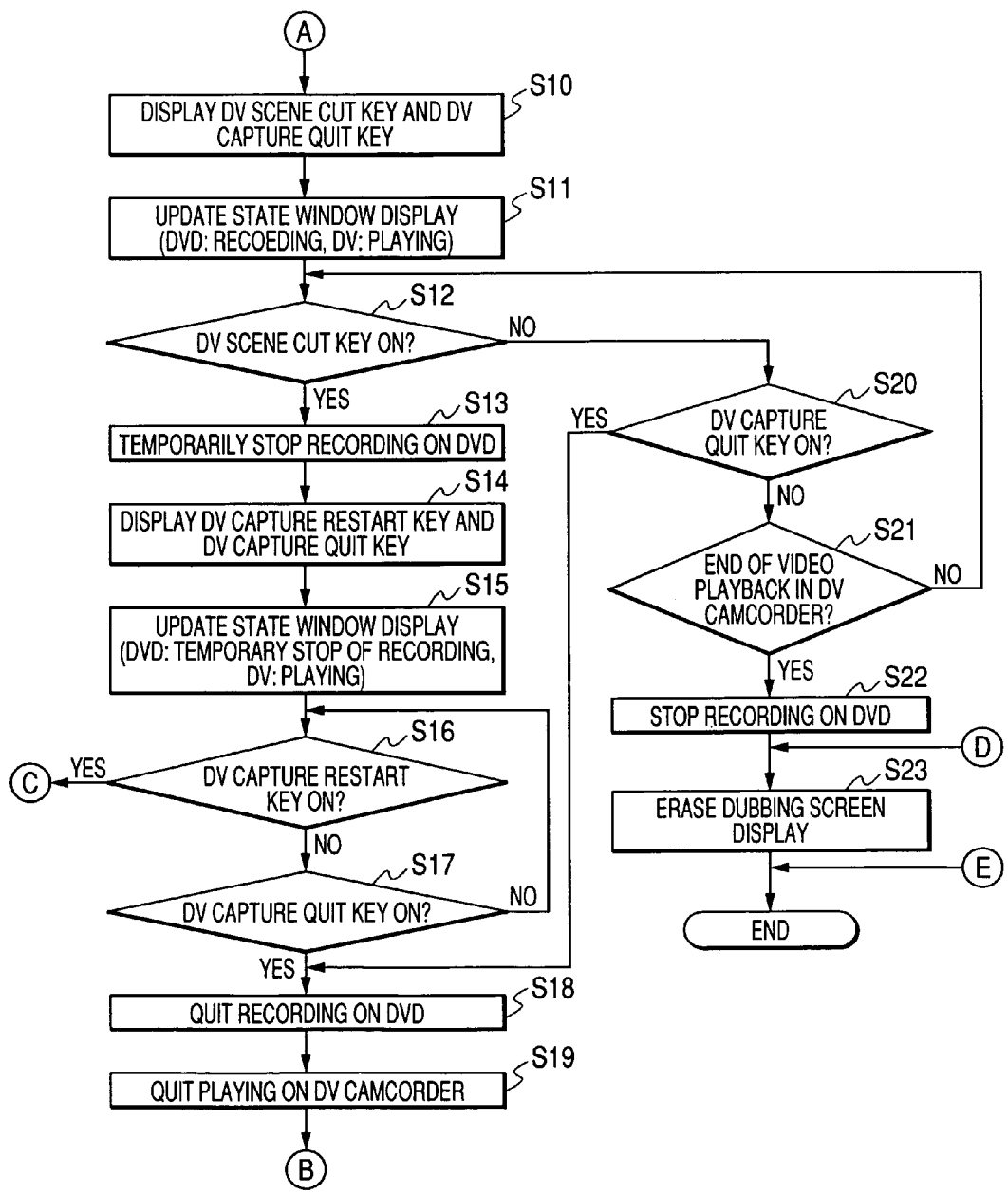

FIG. 5, broken into FIG. 5A and FIG. 5B, is a flowchart to show an operation procedure of the DVD recorder 10. The control section 1 of the DVD recorder 10 (FIG. 1) executes the steps. In FIG. 5, when the user presses the dub key Z1 of the remote controller 9 (FIG. 2) or the dub key Z2 of the setup screen G1 (FIG. 3) and the ON state is entered, the control section 1 checks whether or not the DV camcorder 20 is connected to the DVD recorder 10 by the cable C (step S1). If the DV camcorder 20 is not connected to the DVD recorder 10 (NO at step S1), the control section 1 displays a message of CONNECTION ERROR on-screen on the monitor 31 of the TV 30 (FIG. 1) (step S2) and terminates the processing. In contrast, if the DV camcorder 20 is connected to the DVD recorder 10 (YES at step S1), the control section 1 switches from input video from the tuner 2 (FIG. 1) to input video from the DV camcorder 20 as output video to the TV 30 (step S3). Subsequently, the control section 1 displays the dubbing screen G2 on the monitor 31 as shown in FIG. 4A (step S4) and displays the DV capture start key X1 and the state window W in the screen G2 (step S5). At this time, the state window W indicates that both the DVD recorder 10 and the DV camcorder 20 stop, as shown in FIG. 4A.

Then, upon reception of a transition command to another screen (YES at step S7) as the user operates the menu key Z3 of the remote controller 9 (FIG. 2), a key for entering a display command of input video from the tuner 2 (key 1, etc., in FIG. 2), or the like, without turning on the DV capture start key X1 (NO at step S6), the control section 1 erases the display of the dubbing screen G2 from the monitor 31 (step S23) and terminates the processing. In contrast, if the user presses (turns on) the DV capture start key X1 (YES at step S6), the control section 1 transmits a playback command through the interface 7 to the DV camcorder 20 for causing the DV camcorder 20 to start playing back the record video of the DV cassette 40 (step S8). When the DV camcorder 20 starts playing back video, it transmits the played-back video through the interface 27 to the DVD recorder 10. Then, when the video is input through the interface 7, the control section 1 displays the input video on the dubbing screen G2 and starts recording the input video on the DVD 40 (step S9). Subsequently, the control section 1 displays the DV scene cut key X2 and the DV capture quit key X3 on the screen G2 as shown in FIG. 4B in place of the DV capture start key X1 (step S10) and updates the display of the state window W in the screen G2 (step S11). At this time, the window W indicates that the DVD recorder 10 is recording and the DV camcorder 20 is playing as shown in FIG. 4B.

After a while, display of an unnecessary scene of the input video from the DV camcorder 20 is started on the screen G2. Thus, when the user presses (turns on) the DV scene cut key X2 (YES at step S12), the control section 1 temporarily stops recording the input video from the DV camcorder 20 on the DVD 40 (step S13). Subsequently, the control section 1 displays the DV capture restart key X4 together with the DV capture quit key X3 on the screen G2 as shown in FIG. 4C in place of the DV scene cut key X2 (step S14) and updates the display of the state window W in the screen G2 (step S15). At this time, the window W indicates that the DVD recorder 10 temporarily stops recording and the DV camcorder 20 is playing as shown in FIG. 4C.

The unnecessary scene of the input video from the DV camcorder 20 passes and display of a necessary scene is started on the screen G2. Thus, when the user presses (turns on) the DV capture restart key X4 (YES at step S16), the control section 1 goes to step S9, restarts recording the input video from the DV camcorder 20 on the DVD 40, again displays the DV scene cut key X2 together with the DV capture quit key X3 on the screen G2 as shown in FIG. 4B in place of the DV capture restart key X4 (step S10), and updates the display of the state window W in the screen G2 (step S11). After this, the control section 1 executes step S12 and the later steps as described above.

On the other hand, if the user presses (turns on) the DV capture quit key X3 (YES at step S20) without turning on the DV scene cut key X2 (NO at step S12) after execution of step S11, the control section 1 quits recording the input video from the DV camcorder 20 on the DVD 40 (step S18) and transmits a playback quit command through the interface 7 to the DV camcorder 20 for causing the DV camcorder 20 to quit playing back the video (step S19). When the user presses (turns on) the DV capture quit key X3 (YES at step S17) without turning on the DV capture restart key X4 (NO at step S16) after execution of step S15, the control section 1 also quits recording the input video (step S18) as described above and causes the DV camcorder 20 to quit playing back the video (step S19). When playing back the video is quitted, the video is not input to the DVD recorder 10 from the DV camcorder 20 and thus the blue back video V1 is displayed on the screen G2. Subsequently, the control section 1 again displays the DV capture restart key X4 on the screen G2 as shown in FIG. 4A in place of the DV scene cut key X2 and the DV capture quit key X3 and updates the display of the state window W in the screen G2 (step S5). After this, the control section 1 executes step S6 and the later steps as described above.

After execution of step S11, if the DV scene cut key X2 is not turned on (NO at step S12) and the DV capture quit key X3 is not turned on either (NO at step S20) and the DV camcorder 20 plays back the record video of the DV cassette 50 to the end and playback is completed (YES at step S21), the control section 1 stops recording the video on the DVD 40 (step S22) because video is not input from the DV camcorder 20, erases the display of the dubbing screen G2 from the monitor 31 (step S23), and terminates the processing.

As described above, when dubbing (recording) of the input video from the DV camcorder 20 on the DVD 40 is started, the DV scene cut key X2 is displayed on the monitor 31 of the TV 30, whereby the user can check the input video being dubbed and the DV scene cut key X2 at the same time by seeing the monitor 31, so that it is made possible for the user to reliably cut the unnecessary scene of the video (skip recording the unnecessary scene on the record medium) by properly operating the DV scene cut key X2 with the remote controller just after display of the unnecessary scene is started on the monitor 31. While dubbing the input video from the DV camcorder 20 on the DVD 40, the user can cut the unnecessary scene of the video, so that it is made possible to dub in a short time.

When the DV scene cut key X2 is operated, the DV capture restart key X4 is displayed on the monitor 31 in place of the DV scene cut key X2, whereby the user can check the input video whose dubbing is cut and the DV capture restart key X4 at the same time by seeing the monitor 31, so that the user can properly operate the DV capture restart key X4 just after the unnecessary scene of the video passes and display of a necessary scene is started on the monitor 31, and it is made possible for the user to reliably terminate cutting the unnecessary scene and reliably restart dubbing the necessary scene. The DV scene cut key X2 and the DV capture restart key X4 are switched on the display of the monitor 31, whereby the DV scene cut key X2 is displayed on the monitor 31 while the input video is being dubbed and the DV capture restart key X4 is displayed on the monitor 31 during temporary stop of dubbing, so that it is made possible for the user to reliably operate the two keys X2 and X4 without performing erroneous operation when necessary.

After either the dubbing key Z1 or Z2 is operated, the DV capture start key X1 is displayed on the monitor 31, whereby the user can check the DV capture start key X1 by seeing the monitor 31 and it is made possible for the user to properly operate the start key X1 for starting playback of the video in the DV camcorder 20 and dubbing of the video at the same time. In addition, the user needs only to operate the DV capture start key X1 without operating any operation key provided on the DV camcorder 20, so that the key operation to start dubbing can be facilitated.

When dubbing of the input video from the DV camcorder 20 on the DVD 40 is started, the DV capture quit key X3 is displayed on the monitor 31, whereby the user can check the input video being dubbed and the DV capture quit key X3 by seeing the monitor 31, so that it is made possible for the user to properly operate the quit key X3 in any desired scene for quitting dubbing of the video and playback of the video in the DV camcorder 20 at the same time. In addition, the user needs only to operate the DV capture quit key X3 without operating any operation key provided on the DV camcorder 20, so that the key operation to quit dubbing and playback of the video to be dubbed can be facilitated.

The operation state of the DVD recorder 10 and the DV camcorder 20 is displayed on the monitor 31, whereby the user can keep track of the operation state of the DVD recorder 10 and the DV camcorder 20 by seeing the monitor 31, so that it is made possible to reliably prevent erroneous operation of each key displayed on the monitor 31. Further, the DV capture start key X1, the DV scene cut key X2, the DV capture quit key X3, and the DV capture restart key X4 are switched on the display of the monitor 31, whereby the user can check the key X1 when input video from the DV camcorder 20 does not exist and the key X3 and the key X2 or the key X4 when input video exists by seeing the monitor 31 as required, so that the user can properly operate any necessary key of X1 to X4 when necessary and it is made possible to reliably prevent erroneous operation of the keys X1 to X4.

Figure 6A:
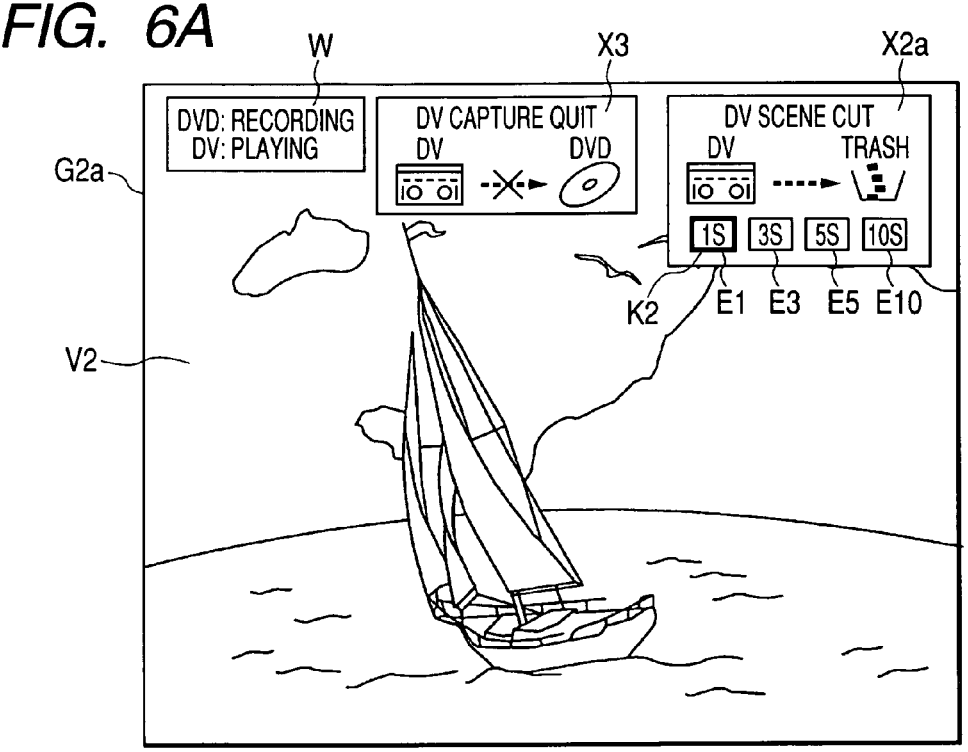
FIG. 6A is a drawing to show a different embodiment.
Figure 6B:
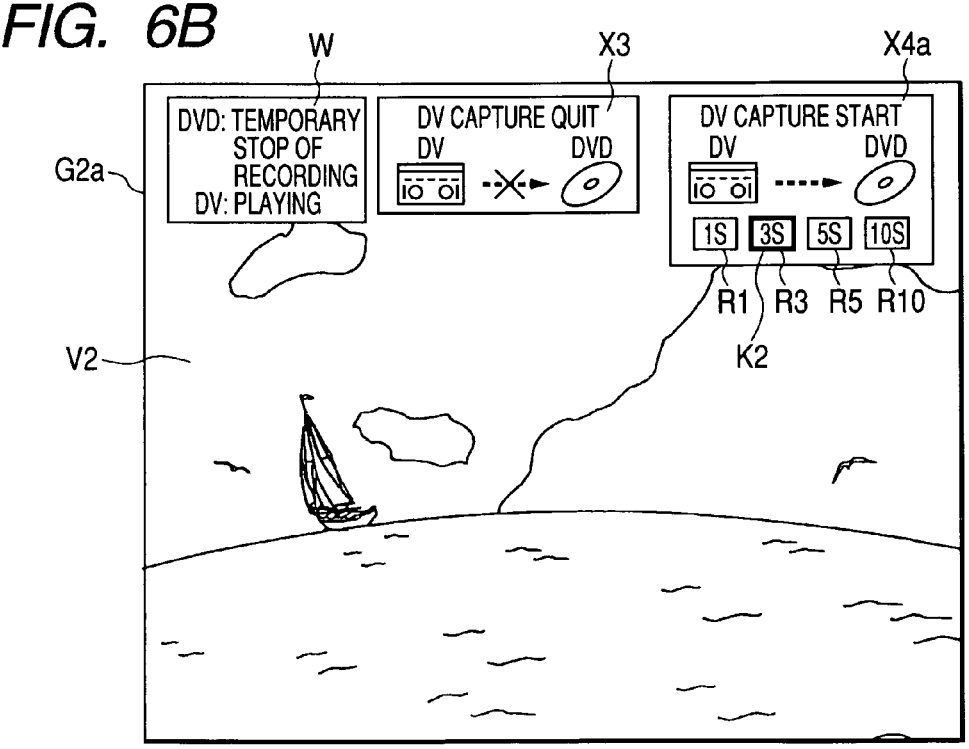
FIG. 6B is a drawing to show the different embodiment.

FIGS. 6A and 6B are drawings to show a different embodiment of the invention. They show examples of screens on-screen displayed on the monitor 31 of the TV 30 described above. Parts identical with those previously described with reference to FIGS. 4B and 4C are denoted by the same reference numerals in FIGS. 6A and 6B. A DV scene cut key X2a displayed on a dubbing screen G2a in FIG. 6A is provided with four erasion setting keys of a 1-second key E1, a 3-second key E3, a 5-second key E5, and a 10-second key E10 for setting the time for retroactively erasing the video recorded on a DVD 40 before the operation time of the cut key X2a. The erasion setting keys E1 to E10 form an erasion setting unit in the invention. If the user operates the above-described arrow key Z5 (FIG. 2) for moving the cursor K2 over any of the erasion setting keys E1 to E10 and then presses the above-described determine key Z4 (FIG. 2), the control section 1 (FIG. 1) determines that the DV scene cut key X2a is operated and is turned on and also determines that the key of the erasion setting keys E1 to E10 over which the cursor K2 is moved is set as the erasion time. The control section 1 temporarily stops recording the input video from the DV camcorder 20 on the DVD 40 as described above and erases the display of the DV scene cut key X2a from the screen G2a and instead displays a DV capture restart key X4a together with DV capture quit key X3 as shown in FIG. 6B.

The DV capture restart key X4a is provided with four record setting keys of a 1-second key R1, a 3-second key R3, a 5-second key R5, and a 10-second key R10 for setting the time for retroactively recording the video input from the DVD 40 before the operation time of the restart key X4a. The record setting keys R1 to R10 form a record setting unit in the invention. If the user operates the arrow key Z5 for moving the cursor K2 over any of the record setting keys R1 to R10 and then presses the determine key Z4, the control section 1 determines that the DV capture restart key X4a is operated and is turned on and also determines that the key of the record setting keys R1 to R10 over which the cursor K2 is moved is set as the record time. The control section 1 overwrites the video recorded on the DVD 40 before the erasion time set with any of the erasion setting keys E1 to E10 from the operation time of the DV scene cut key X2a with the input video from the DV camcorder 20 before the record time set with any of the record setting keys R1 to R10 from the operation time of the DV capture restart key X4a. Specifically, for example, if the erasion time of one second is set with the erasion setting 1-second key E1 and the record time of three seconds is set with the record setting 3-second key R3, the control section 1 overwrites the video recorded on the DVD 40 from one second before the operation time of the DV scene cut key X2a to the operation of the key X2a with the video input from the DV camcorder 20 three seconds before the operation time of the DV capture restart key X4a.

In doing so, it is made possible to reliably cut the unnecessary scene before the actual operation time of the DV scene cut key X2a since starting of display of the unnecessary scene of the input video from the DV camcorder 20 on the monitor 31. It is also made possible to reliably dub the necessary scene before the actual operation time of the DV capture restart key X4a since starting of display of the necessary scene after passage of the unnecessary scene of the input video from the DV camcorder 20.

In the description of the embodiments, the case where the DV camcorder 20 is used as the video playback apparatus is taken as an example, but the invention is not limited to it. In addition, for example, a digital video, an HDD (hard disk drive) recorder, a DVD recorder, etc., not provided with an image pickup section such as a camera may be used. That is, the video playback apparatus may be an AV machine if it includes an interface for communicating with a video record apparatus connected to the video playback apparatus (AV machine) by a cable, etc., and can play back the video recorded on a record medium for input to the video record apparatus.

Further, in the embodiments described above, the case where the invention is applied to the DVD recorder 10 is taken as an example, but the invention is not limited to it. In addition, for example, the invention can also be applied to AV machines capable of recording a video on a record medium, such as an HDD recorder, a DVD recorder with an HDD, and a combination TV and DVD recorder, etc.

What is claimed is:

1. A video record apparatus comprising:

an IEEE 1394 interface for communicating with a video playback apparatus connected to the video record apparatus;

a remote controller operated by a user to enter an operation command; and a control section for displaying a video played back in the video playback apparatus and input through the interface on a monitor of a television connected to the video record apparatus and recording the video on a record medium based on user's operation of the remote controller, wherein:

the control section displays the operation state of the video record apparatus and the video playback apparatus and a record start key for entering a record start command of the video of the video playback apparatus on the monitor;

when the user operates the record start key with the remote controller, the control section transmits a control signal through the interface to the video playback apparatus for causing the video playback apparatus to start playing back the video, starts recording the video played back and input from the video playback apparatus on the record medium, and displays a record cut key for entering a temporary stop command of recording the input video from the video playback apparatus and a record quit key for entering a record quit command of the input video on the monitor in place of the record start key;

when the user operates the record cut key with the remote controller, the control section temporarily stops recording the input video on the record medium and displays a record restart key for entering a record restart command of the input video on the monitor in place of the record cut key;

when the user operates the record restart key with the remote controller, the control section restarts recording the input video on the record medium and again displays the record cut key on the monitor in place of the record restart key; and when the user operates the record quit key with the remote controller, the control section quits recording the input video on the record medium, transmits a control signal through the interface to the video playback apparatus for causing the video playback apparatus to quit playing back the video, and again displays the record start key on the monitor in place of the record quit key and the record cut key or the record restart key.

2. A video record apparatus comprising:

a communication unit for communicating with a video playback apparatus connected to the video record apparatus;

an operation unit operated by a user to enter an operation command, and a control unit for displaying a video played back in the video playback apparatus and input through the communication unit on a display unit connected to the video record apparatus and recording the video on a record medium based on user's operation of the operation unit, wherein:

when starting to record the input video from the video playback apparatus on the record medium, the control unit displays a record cut key for entering a temporary stop command of recording the input video on the display unit; and when the user operates the record cut key through the operation unit, the control unit temporarily stops recording the input video on the record medium.

3. The video record apparatus according to claim 2 wherein:
   when the user operates the record cut key through the operation unit, the control unit displays a record restart key for entering a record restart command of the input video from the video playback apparatus on the display unit in place of the record cut key; and
   when the user operates the record restart key through the operation unit, the control unit restarts recording the input video on the record medium and displays the record cut key on the display unit in place of the record restart key.

4. The video record apparatus according to claim 2, wherein
   the control unit displays a record start key for entering a record start command of the video of the video playback apparatus on the display unit; and
   when the user operates the record start key through the operation unit, the control unit transmits a control signal through the communication unit to the video playback apparatus for causing the video playback apparatus to start playing back the video, starts recording the video played back and input from the video playback apparatus on the record medium, and displays the record cut key on the display unit in place of the record start key.

5. The video record apparatus according to claim 2, wherein:
   when starting to record the input video from the video playback apparatus on the record medium, the control unit displays a record quit key for entering a record quit command of recording the input video; and
   when the user operates the record quit key through the operation unit, the control unit quits recording the input video on the record medium and transmits a control signal through the communication unit to the video playback apparatus for causing the video playback apparatus to quit playing back the video.

6. The video record apparatus according to claim 2, wherein:
   the control unit displays the operation state of the video record apparatus and the video playback apparatus on the display unit.

7. The video record apparatus according to claim 2, further comprising
   an erasion setting unit for setting the time for retroactively erasing the video recorded on the record medium before the operation time of the record cut key, wherein
   when the user operates the record restart key for entering a record restart command of the input video from the video playback apparatus after operating the record cut key through the operation unit, the control unit overwrites the video recorded on the record medium before the time set with the erasion setting unit from the operation time of the record cut key with the input video from the video playback apparatus.

8. The video record apparatus according to claim 2, further comprising
   a record setting unit for setting the time for retroactively recording the video input from the video playback apparatus before the operation time of the record restart key for entering a record restart command of the input video from the video playback apparatus, wherein
   when the user operates the record restart key through the operation unit, the control unit records the input video from the video playback apparatus before the time set with the record setting unit from the operation time of the record restart key.

* * * * *